(12) United States Patent
Busch et al.

(10) Patent No.: US 8,980,144 B2
(45) Date of Patent: Mar. 17, 2015

(54) METHOD FOR PRODUCING POLYPROPYLENE FILMS

(75) Inventors: Detlef Busch, Saarlouis (DE); Harald Eiden, Homburg (DE); Christian Peters, St. Ingbert (DE); Josef Schaan, Lebach (DE)

(73) Assignee: Treofan Germany GmbH & Co. KG (DE)

( * ) Notice: Subject to any disclaimer, the term of this patent is extended or adjusted under 35 U.S.C. 154(b) by 514 days.

(21) Appl. No.: 13/132,966

(22) PCT Filed: Dec. 8, 2009

(86) PCT No.: PCT/EP2009/008746
§ 371 (c)(1),
(2), (4) Date: Jun. 6, 2011

(87) PCT Pub. No.: WO2010/066398
PCT Pub. Date: Jun. 17, 2010

(65) Prior Publication Data
US 2011/0236702 A1    Sep. 29, 2011

(30) Foreign Application Priority Data
Dec. 10, 2008  (DE) .......................... 10 2008 061 504

(51) Int. Cl.
*B29C 47/06* (2006.01)
*B32B 27/32* (2006.01)
(Continued)

(52) U.S. Cl.
CPC ......... *B29B 17/0005* (2013.01); *B29C 47/0021* (2013.01); *B29C 47/003* (2013.01);
(Continued)

(58) Field of Classification Search
USPC ...................................................... 264/37.32
See application file for complete search history.

(56) References Cited

U.S. PATENT DOCUMENTS 5,128,212 A * 7/1992 Kneale et al. .................. 428/516
5,252,389 A   10/1993 Schmidt et al.
(Continued)

FOREIGN PATENT DOCUMENTS

EP    0740993 A2    11/1996
EP    1426164 A2     6/2004

OTHER PUBLICATIONS

International Preliminary Report on Patentability dated Jun. 14, 2011 in International Application No. PCT/EP2009/008746.

*Primary Examiner* — Monique Jackson
(74) *Attorney, Agent, or Firm* — Drinker Biddle & Reath LLP (57) ABSTRACT

The invention relates to a method for producing a biaxially oriented polypropylene film including at least one layer, which is constructed from propylene polymer B and a propylene polymer that has been recycled once. The method includes heat and melting propylene polymer B in a first extruder and heating a melting a propylene polymer A without a fraction of recycled material in a second extruder. The molten mass of the propylene polymer A is fed to two sides of the propylene polymer molten mass of B such that the propylene polymer A forms border regions of the film during the production process. The two border regions are then cut off after longitudinal and traverse stretching of the film, and melted and mixed together with the propylene polymer B and extruded to form a precursor film in the first extruder. The biaxially oriented polypropylene film comprising a propylene polymer that has been recycled only once is useful for producing capacitors.

14 Claims, 4 Drawing Sheets (51) Int. Cl.
- B29B 17/00 (2006.01)
- B29C 47/00 (2006.01)
- B29C 47/56 (2006.01)
- H01G 4/18 (2006.01)
- B29C 47/14 (2006.01)
- B29C 55/12 (2006.01)
- B29K 23/00 (2006.01)
- B29K 105/00 (2006.01)
- B29K 105/26 (2006.01)
- B29L 9/00 (2006.01)

(52) U.S. Cl.
CPC ............... B29C47/062 (2013.01); B29C 47/56 (2013.01); H01G 4/18 (2013.01); B29C 47/14 (2013.01); B29C 47/145 (2013.01); B29C 55/12 (2013.01); B29K 2023/12 (2013.01); B29K 2105/256 (2013.01); B29K 2105/26 (2013.01); B29L 2009/00 (2013.01); B29C 47/0057 (2013.01)

USPC ....... 264/37.32; 264/37.1; 264/37.3; 428/516

(56) References Cited

U.S. PATENT DOCUMENTS

| | | | |
|---|---|---|---|
| 5,605,660 A * | 2/1997 | Buongiorno et al. | 264/456 |
| 5,716,570 A | 2/1998 | Peiffer et al. | |
| 8,460,588 B2 * | 6/2013 | Lake et al. | 264/173.14 |
| 2004/0030050 A1 | 2/2004 | Lin et al. | |

* cited by examiner

METHOD FOR PRODUCING POLYPROPYLENE FILMS

CROSS-REFERENCE TO RELATED APPLICATIONS

This application is a national stage application (under 35 U.S.C. §371) of PCT/EP2009/008746, filed Dec. 8, 2009, which claims benefit of German application 10 2008 061 504.8, filed Dec. 10, 2008.

BACKGROUND OF THE INVENTION

The present invention relates to a method for producing biaxially oriented polypropylene films including at least one layer, and use thereof.

Biaxially oriented polypropylene films (BOPP films) are used in a wide range of packaging applications because of their good performance characteristics. These good performance characteristics are for example high mechanical strengths, good dimensional stability and visual brilliance. Besides their use as packaging films, considerable quantities of BOPP films are also used in technical applications. These include metallisation and transfer metallisation, lamination and use an electrical insulator in capacitor manufacturing.

Various methods for producing biaxially oriented polypropylene films are known from the prior art. In the "tenter process", the BOPP film is produced by extruding, shaping in a slot die and stretching in the longitudinal and transverse directions.

In detail, this method is carried out in such manner that the propylene polymers are compacted, heated and melted in an extruder, then the molten masses corresponding to the respective plies of the film are extruded through a flat sheet die, and the film obtained thereby is drawn on one or more rollers to stabilise it, the film is oriented and then thermofixed. Finally, the machine roll produced in this way is processed to create the cut roll ready for use by the customer.

In this process for producing biaxially oriented films, a large amount of film trimmings is created during the process itself, for example due to the edge strip. Edge strips are the borders of the film that are gripped by the clips of the lateral stretching frame but not stretched as well during transverse stretching. The unstretched border is significantly thicker than the film after orientation and must therefore be cut off. Depending on the film type and machine width, the amount of material lost with the edge strip may be as much as 25% by weight. For reasons of economy, the edge strip must be regranulated and returned to the original feedstock of raw material together with the rest of the film trimmings that is created when the cut roll is prepared, in the event of tearing or at the infeed to or outfeed from the machine.

In some application areas requiring particularly high quality standards of the film, it is not possible to reuse film trimming with the original raw material feedstock in this way again. This is true for example in the production of electroinsulating films that are used for manufacturing capacitors. For these applications, particular film properties such as low dielectric loss factor, high electrical pass resistance, high DC and AC proof voltages, and the smallest possible number of flaws are required. One of the ways to obtain these properties is to use exceptionally pure polypropylene with low ash and chlorine content. In addition, the polymers must not contain any ionogenic components. Of course, raw materials that meet these purity requirements are significantly more expensive than conventional raw materials for packaging.

It has been found that the high quality requirements for such electroinsulating films are no longer met if film trimmings is added to the ultra-pure raw material. The continuous use of trimmed film in the production inevitably results in a certain content in the film of material that has been recycled multiple times, since film material that already contains some recycled material is itself constantly returned to the recycling circuit. Material that has already been recycled several times is also decomposed and contaminated repeatedly in each new cycle, so the quality of the repeatedly recycled material becomes steadily poorer. The more cycles the respective fraction of recycled material undergoes, the lower its proportion in the finished film becomes, but the quality of this proportion is steadily degraded at the same rate.

The result of this in practice is that the film trimmings generated when manufacturing electroinsulating films becomes waste by definition, and can only be used in applications with less stringent requirements, such as production of packaging materials or injection moulding. As a result, the financial losses associated with film trimmings in the production of electrofilms are particularly significant.

Even in the field of packaging films that are produced from relatively less expensive raw materials, the quality of the film can be impaired by material that has been recycled multiple times, particularly if the fraction thereof becomes too high. In this case, therefore the proportion of material that has been recycled multiple times in the film must be monitored, and reduced if necessary. Thus, in this area too, there is a need for a method for improving economy and quality in the film manufacturing processes.

European patent EP 0 740 993 describes a method for producing biaxially oriented polypropylene films in which the border area is created separately from a lower-quality raw material. The highly pure propylene polymer of the film is remelted in a separate extruder and extruded together with this second, lower-quality propylene polymer from a second extruder. The molten mass of the second propylene polymer is directed along both sides of the first propylene polymer mass in such manner that the two molten masses are extruded together and simultaneously through the flat sheet die, and the lower-quality propylene polymer forms the border area of the film during the manufacturing process. After the film has been stretched longitudinally and laterally, this border area may be separated and used again.

In practice, it is been found that a number of disadvantages are associated with this method. The two different polymers mingle with one another at the boundary between the film border and the film in such manner that is it difficult to separate the lower-quality polymer. Either the film itself is contaminated by the lower quality polymer in the border area, so that the quality is not consistent over the entire width of the film, or an excessively wide border must be cut off, thereby reducing the yield of the method. It has also be found that after several cycles the polymer in the border area is degraded to such an extent that is must be replace with fresh material. This also renders the method less financially advantageous.

Accordingly, there is still a need for suggesting a method for producing films from high-quality, for example particularly pure, polypropylene, that avoids the disadvantages described in the preceding. The method is intended particularly to reduce the financial losses associated with film trimmings that cannot be reused.

BRIEF SUMMARY OF THE INVENTION

This object is solved with a method for producing a biaxially oriented polypropylene film, consisting of at least one layer, and in which a polypropylene polymer B is heated and melted in a first extruder, and the molten mass of the propylene polymer B is extruded through a flat sheet die, and the molten mass exiting the flat sheet die is drawn on one or more rollers to and solidified to form the precursor film, and this precursor film is stretched longitudinally and laterally, characterized in that A. a propylene polymer or a propylene polymer mixture A with no recycled content A is heated and melted in a second extruder, and
B. the molten mass of the propylene polymer or propylene polymer mixture A is directed along both sides of molten propylene polymer mass B in such manner that all of the molten masses are extruded through the flat sheet die together and at the same time, and the propylene polymer or propylene polymer mixture A with no recycled content forms the border area of the film during the manufacturing process, and
C. the border areas consisting of the propylene polymer or propylene polymer mixture A are cut away after the film has been stretched longitudinally and laterally, and
D. this material cut off from the border area is mixed with the polypropylene polymer B and this mixture is melted and extruded to form the precursor film in the first extruder.

DETAILED DESCRIPTION OF THE INVENTION

The method according to the invention ensures that all of the film trimming from the border area is reusable, but the film contains no material that has passed through the treatment process more than once. This, the final product consists entirely of virgin material and material that has undergone not more than one recycling step.

For the purposes of the present invention, virgin material or virgin polymer is understood to mean a polymer or polymer mixture that has not previously been used in a film manufacturing process and has not undergone a melting process with subsequent solidification of the molten mass for film production. With regard to a polymer mixture, the same applies for all components of the mixture. In this sense, both polypropylene polymer B and polypropylene polymer A are virgin polymers. Both polymer A and polymer B may also be mixtures of various virgin propylene polymers.

For the purposes of the present invention, recycled material is a polymer or polymer mixture that has already been used as defined in a film manufacturing process, and has been melted and resolidified during film production and possibly in a subsequent treatment process as well.

For the purposes of the present invention, material that has been recycled multiple times is recycled material that has been melted and solidified more than twice in total during film production and treatment.

For the purposes of the present invention, material that has been recycled once is recycled material that has been melted and solidified either only once, during film production, or twice the second time in a subsequent treatment step. When material that has been recycled once is used to manufacture a film, this portion of the recycled material is melted and solidified again, of course.

In this way, a film that is manufactured according to the method of the invention consists primarily of virgin polymer B, which has been melted and resolidified only once, during the actual film production process. Material that has been recycled once also contains fractions from a polymer or polymer mixture A that has been melted and solidified two or three times, that is to say a first time when it passed through the film manufacturing process as the border strip of the film, and a second time by mixing with polymer B to produce the film product, and possibly also a third time during processing of the border strip trimming, to turn it into granulate for example. Accordingly, polymers A and B differ in that polymer B is melted and solidified in the film once, and polymer A is melted in the film twice or three times. In general, the film contains from 0.5 to 60% by weight of material that has been recycled once from polymer A, preferably 1 to 50% by weight, particularly 5 to 40% by weight, and correspondingly 40 to 99.95% by weight and preferably 50 to 99% by weight of polymer B, relative to the total weight of the film in each case. In all cases, it is possible that either or both of polymer B and the border strip polymer A also consist of a mixture of various polymers. According to the invention, all fractions of such a polymer mixture B are virgin material and all fractions of a polymer mixture A, which are used to manufacture the film, have been recycled no more than once.

In all cases, in the method according to the invention different polymers may used as propylene polymer B for the film and as propylene polymer A for the border area, similarly to the method described in EP 0 740 993. However, unlike the method described in EP 0 740 993, polymer A for the border area is to be selected such that it generally satisfies the requirements for film manufacture as well, since it is to be used in the film itself after it has been used as border material. Consequently, in the method according to the invention it is generally preferred if the same polymers, or at least polymers of comparable quality, are used in the border area and in the film. According to the invention, the trimmed material from the border area is not used for border extrusion again, instead it is mixed with the film polymer B and used together to this to produce the film, to ensure that the film itself only contains virgin raw material and material that has been recycled only once.

Surprisingly, the quality of the film, and particularly its electrical properties, are not impaired by the addition of the material that has been recycled once. According to the prior art, no recycled material is used in electroinsulating films because the electrical properties are impaired by the material that has been recycled multiple times. In packaging films, excessively high quantities of material that has been recycled multiple times can degrade the mechanical properties or transparency. It is assumed that these impairments are caused by an excessively high proportion of material that has been recycled multiple times, although their proportion becomes progressively smaller as the number of recycling steps increases. Surprisingly, when material that has been recycled only once is added, only minor impairments are caused in the film properties, or none at. The slight impairments of film properties caused by material that has been recycled only once are of such an order that they may be compensated by reducing the proportion of material that has been recycled once.

In the following, suitable polymers both for polymer A of the border area and for polymer B of the film will be described. Polymers A and B may, but do not necessarily have to have identical properties. They are preferably the same polymers. Thus the designation as polymer A and polymer B is not indicative of a different composition or different structure of the polymers, but rather of the different use of the polymers designated as such, on the one hand in the border area (polymer A) and on the other in the films (polymer B).

In general, polymers A/B have a residual ash content less than or equal to 70 ppm, preferably ≤50 ppm, particularly ≤40 ppm, and a chlorine content of ≤50 ppm, preferably ≤20 ppm.

In general, polymers A/B contain 90 to 100% by weight, preferably 95 to 100% by weight, particularly 98 to 100% by weight propylene units relative to the weight of the polymer. In general, polymers A/B have a melting point of 150° C. or higher, preferably 155 to 170° C., and a melt flow index of 0.5 g/10 min to 10 g/10 min, preferably 0.8 g/10 min to 5 g/10 min, measured at 230° C., and a force of 21.6 N (DIN 53 735).

Particularly suitable polymers A/B have an average molecular weight Mw in the range from 150,000 to 400,000, preferably from 180,000 to 350,000. The molecular weight distribution may vary within wide limits, Mw/Mn is generally from 2 to 15, preferably from 2 to 6, particularly from 3 to 6.

Of the polymers A/B described above, isotactic propylene homopolymer with an n-heptane soluble fraction of 1 to 15% by weight, preferably 1 to 10% by weight, and a chain isotaxy index of the n-heptane insoluble fraction of ≥85%, preferably ≥90%, are particularly preferable. Copolymers of ethylene and propylene having an ethylene content of 10% by weight or less, copolymers of propylene with C4-C6 olefins having an olefin content of 10% by weight or less, terpolymers of propylene, ethylene and butylene having an ethylene content of 10% by weight or less and a butylene content of 15% by weight or less are also suitable. The weight percentages cited are relative to the respective propylene polymer.

In order to improve certain properties of the polypropylene film according to the invention, stabilisers and/or neutralisers, and possibly nucleating agents as well are generally added to polymers A/B. With regard to the desired electrical properties of the film, in a preferred embodiment no antistatic agents and no lubricants should be added, because additives have a negative effect on the electrical properties of the film. All quantities indicated in percent by weight (% by weight) in the following description are relative to the layer or layers to which the additive may be added.

The usual compounds with stabilising effects for polymers of polyethylene, propylene and other alpha-olefins may be used as stabiliser. The quantity in which these are added is between 0.05 and 2% by weight. Phenolic stabilisers, alkaline/alkaline earth stearates and/or alkaline/alkaline earth carbonates are particularly suitable. Phenolic stabilisers are preferred in a quantity from 0.1 to 0.6% by weight, particularly 0.15 to 0.3% by weight, and having a molar mass of more than 500 g/mol. Pentaerytrhritol tetrakis-3-(3,5-di-tert-butyl-4-hydroxyphenyl) propionate or 1,3,5-trimethyl-2,4,6-tris(3,5-di-tert-butyl-4-hydroxybenzyl)benzene are particularly advantageous.

Neutralisation agents are preferably calcium stearate and/or calcium carbonate having an average particle size not exceeding 0.7 μm, an absolute particle size smaller than 10 μm and a specific surface area of at least 40 m2/g. In general, the neutralisation agent is added in a quantity of 0.02 to 0.5% by weight.

Nucleation means may be organic substances, preferably dibenzylidene sorbitol or chemically modified derivatives of dibenzylidene sorbitol or sodium-bis-(4-tert.-butylphenyl) phosphate. Other nucleation agents that may be used are for example metal salts of benzoic acid, preferably sodium benzoate, and quinacridone and quinacridone derivatives. Inorganic nucleation agents such as talcum, silicon dioxide or bentonite are also suitable. In this case, it is most important that the nucleation agent is extremely finely distributed, that is to say the average particle size is not more than 1 μm, preferably not more than 0.7 μm.

If polymers A and B are not identical, the melting points of the two polymers should be approximately the same, that is to say they should advantageously not differ by more than 15° C., preferably not more than 10° C., or they should be approximately the same. Moreover, if the melt flow indices (MFI) of the two raw materials are different, they must generally be matched with one another so that the edge strips and the film are firmly bonded with one another. The MFI of propylene polymer A should preferably have a value not more than three times greater than the MFI of propylene polymer B. If necessary, the melt flow indices of the two polymers may be equal, or the MFI of propylene polymer A may be slightly smaller (10%) than that of propylene polymer B.

It is possible that the thickness of the film edge may be deliberately varied or adjusted even with a constant die setting by means of the MFI of polymer A, without changing the thickness of the film itself. The larger the MFI of polymer A relative to the MFI of polymer B, the thicker the border area becomes and vice versa. In this way, the thickness of the edge strip may be optimised independently of the film that is to be manufactured. This is particularly advantageous when producing very thing films. According to conventional methods, the die must be opened very wide in the border area to enable production of a sufficiently thick edge strip. In this event, the there is a danger that the die lips will be bent irreparably. According to the method of the invention, such extreme die settings are no longer necessary for manufacturing very thin films.

According to the method of the invention, single-layer or multi-layer films may be produced. Multi-layer polypropylene films include the film described in the preceding, or the layer of these single-layer embodiments as the base layer, and at least one covering layer, possible one on either side, containing in general 75 to 100% by weight, preferably 90 to 99.5% by weight relative to the weight of the covering layer in each case, polymers of olefins having 2 to 10 carbon atoms and optionally also usual additives, each in effective quantities, provided they do not negatively affect the electrical or other desired properties.

Suitable olefin polymers for the cover layer(s) are for example homopolymers, co- or terpolymers created from ethylene, propylene or butylene units, wherein terpolymers contain three different monomers. The composition of the co- or terpolymers from the respective monomers may vary within broad limits. In general, the co- and/or terpolymers contain more than 50% by weight propylene units, that is to say they are propylene co- and/or propylene terpolymers with ethylene and/or butylene units as comonomers. Copolymers generally include at least 60-99% by weight, preferably 65 to 97% by weight propylene and not more than 1-40% by weight, preferably 3 to 35% by weight ethylene or butylene as comonomers. Terpolymers generally include 65 to 96% by weight, preferably 72 to 93% by weight propylene, and 3 to 34% by weight, preferably 5 to 26% by weight ethylene and 1 to 10% by weight, preferably 2 to 8% by weight butylene. The melt index of the co- and/or terpolymers is generally from 0.1 to 20 g/10 min (190° C., 21.6N), preferably from 0.1 to 15 g/10 min. The melting point may be in a range from 70 to 150° C., preferably from 100 to 140° C.

The co- and terpolymers described in the preceding may be mixed with each other. In this case, the proportions of co- and terpolymers may be varied at will.

In a preferred embodiment, propylene homopolymer is used in the covering layer(s) instead of the name co- and/or terpolymers. Suitable propylene homopolymers are those that were described individually as virgin propylene homopolymers B of the film in the preceding.

For the use as electroinsulating films, embodiments are particularly preferred that include cover layers on one or both sides, which in turn are constructed from virgin propylene polymer, that is to say have a content of this virgin propylene polymer in an amount from 90-100% by weight, preferably 98-<100% by weight. Suitable virgin propylene polymers have been described in the preceding as polymers A/B.

It was found that these embodiments offer additional advantages when they are used in capacitors. This is attributed to the fact that the base layer, which contains material that has been recycled once as well as polymer B, is covered by at least one covering layer without an recycled material, so that any possible negative effects of the recycled material component are reduced. Accordingly, it is particularly preferred to cover the base layer containing recycled material on both sides with cover layers that do not contain any recycled material.

Multiple-layer embodiments of films that are manufactured according to the method of the invention include a base layer and at least the cover layer described in the preceding. The base layer may also have cover layers on both sides and possibly additional intermediate layers. For the purposes of the present invention, the base layer is the layer that constitutes from more than 50 to 100%, preferably 70 to 95% of the total film thickness. The cover layer is the layer that forms the outer layer of the film.

The total thickness of the films that may be produced according to the method of the invention may be varied within wide limits, and is adapted to its intended use. The preferred embodiments of the film have total thicknesses from 2 to 100 µm, and 2 to 50 µm, particularly 2 to 20 µm are preferred. The thickness of any intermediate layer(s) present is from 0.5 to 15 µm. The thickness of the cover layer(s) is preferably in the range from 0.1 to 10 µm, particularly 0.2 to 5 µm, and cover layers that are applied on either side may have the same or different thicknesses and compositions. The thickness of the base layer is determined by the difference between the total thickness of the film and the thickness of the applied cover and intermediate layer(s), and may thus vary in similar manner to the total thickness.

Figure 3:
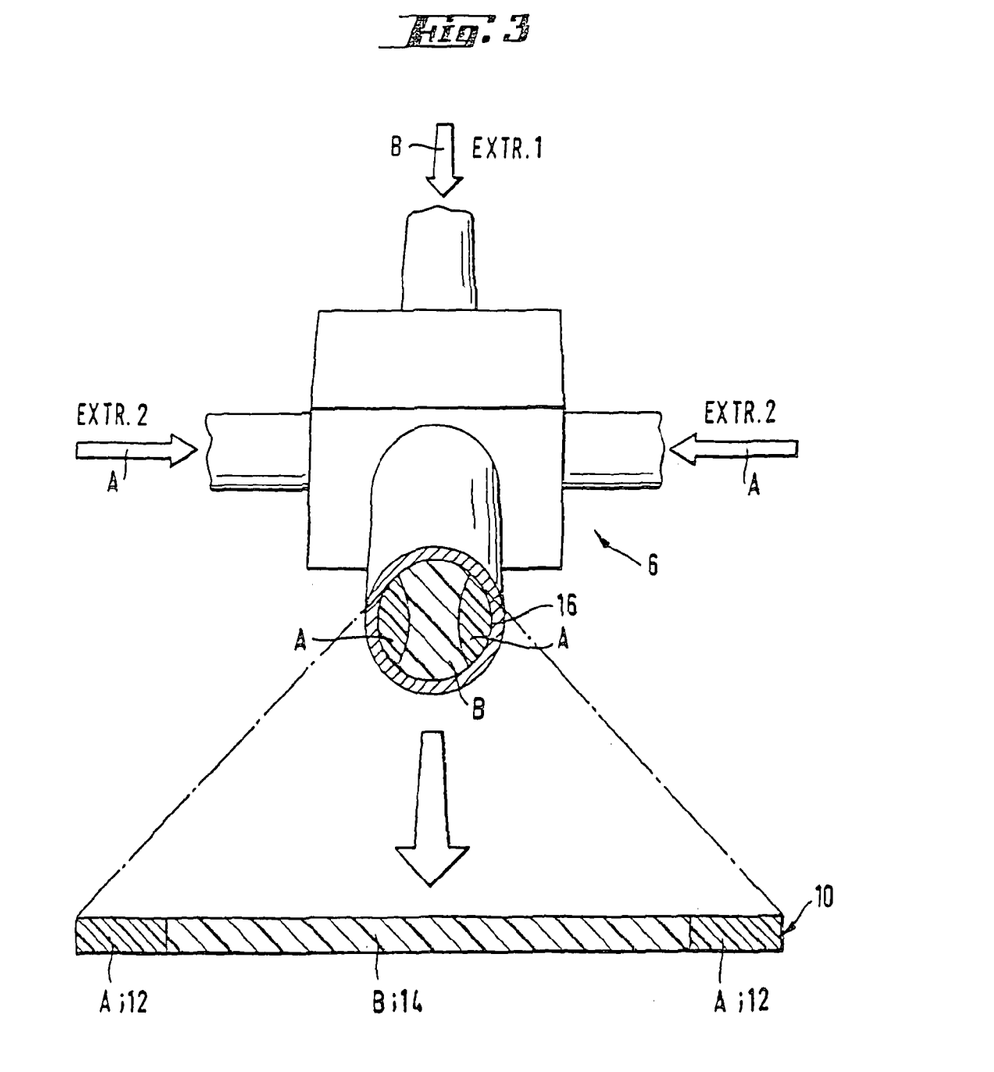
FIGS. 3 AND 3A depict the use of a coextrusion adapter 6 in an arrangement according to the invention.

In the course of the method according to the invention, propylene polymers B and material recycled once from polymer A are mixed, compacted, heated and melted (molten mass 1) in a first, main extruder (EXTR. 1). Propylene polymer A (only virgin material) is also compacted, heated and melted (molten mass 2) in a second extruder (EXTR. 2). No material that has already been used in the manufacture of a film is added to propylene polymer A (called "virgin" for the purposes of the invention). Molten mass 2 of the virgin propylene polymer A is directed towards the two sides of molten mass 1 consisting of polymer B and material that has been recycled once, such that the two molten masses 1 and 2 are extruded together and simultaneously through the flat sheet die, and propylene polymer A forms the border area of the film during the manufacturing process. Guidance of polymer molten mass 2 towards the edge of molten mass 1 may be effected, as shown in FIG. 3, using a coextrusion adapter that has been rotated through 90°. Of course, when there is no recycled material present at the start of the manufacturing process, molten mass 1 will consist only of polymer B (with recycled material), until enough recycled material from polymer A has been produced to feed it back into the process.

Figure 3A:
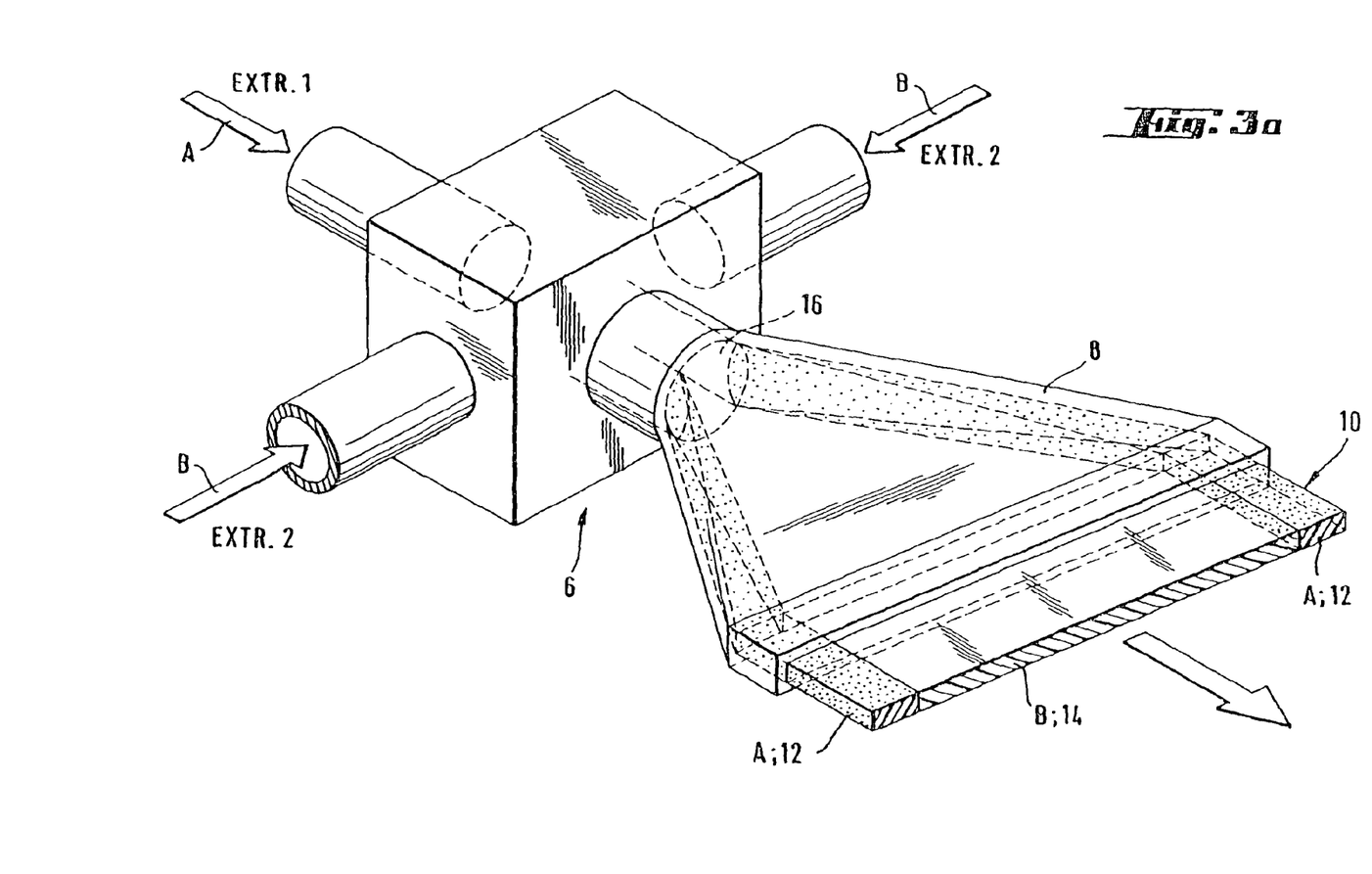

FIGS. 3 and 3A represent the use of coextrusion adapter 6 in an arrangement according to the invention. The process of compacting, heating and melting the polymers and feeding is similar for both molten mass flows 1 and 2. Molten mass flows 1 and 2 are arranged beside one another as shown (16). The adjacent molten masses are extruded in slot die 8 to create film (10), whose border areas (12) are produced from polymer A (from the molten mass flow from extruder 2). The actual film (14) consists of polymer B (from the molten mass flow from extruder 1).

Figure 4A:
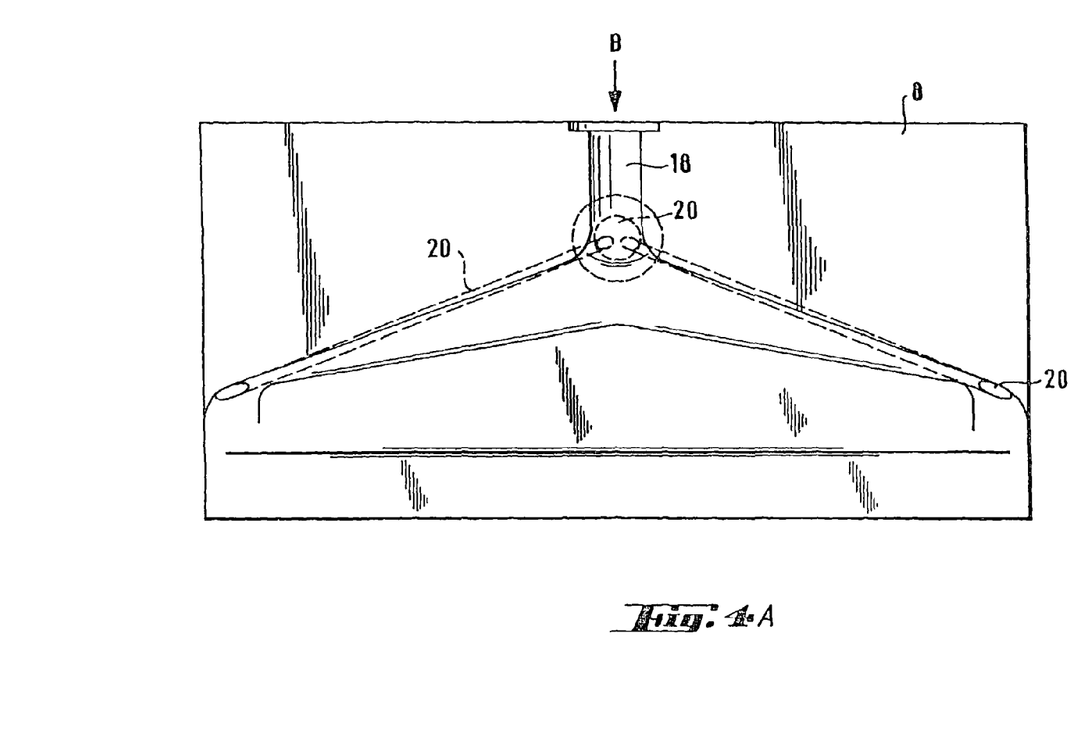
FIGS. 4A AND 4B depict the basic construction of a mono nozzle according to the invention.
Figure 4B:
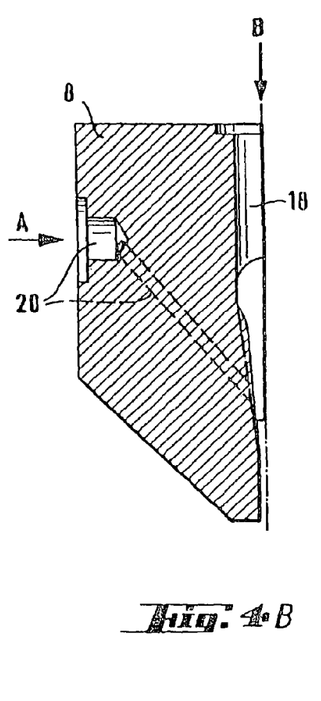

A mono nozzle with which molten mass A is injected laterally is also suitable for the method according to the invention. The basic construction of such a mono nozzle is shown in FIGS. 4A and 4B. Slot die 8 has one aperture 20 each to the left and right of main channel 18. Molten mass B is forced through main channel 18 in the central part of the die. Molten mass A flows through apertures 20 into the two border areas of the die. In this way, molten masses 1 and 2 are extruded side by side to form a film whose border areas consist of polymer A.

The film extruded in this way is drawn on one or more rollers to solidify it. It has also proven particularly advantageous if the draw-off roller(s) by which the extruded film is solidified are maintained at a temperature of at least 70° C., preferably 80 to 120° C.

Figure 1:
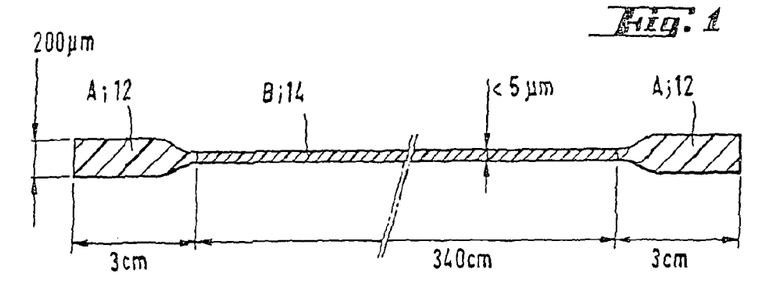
FIG. 1 shows a side view of a stretched film of the invention wherein the borders (12) remain unstretched and thick.
Figure 2:
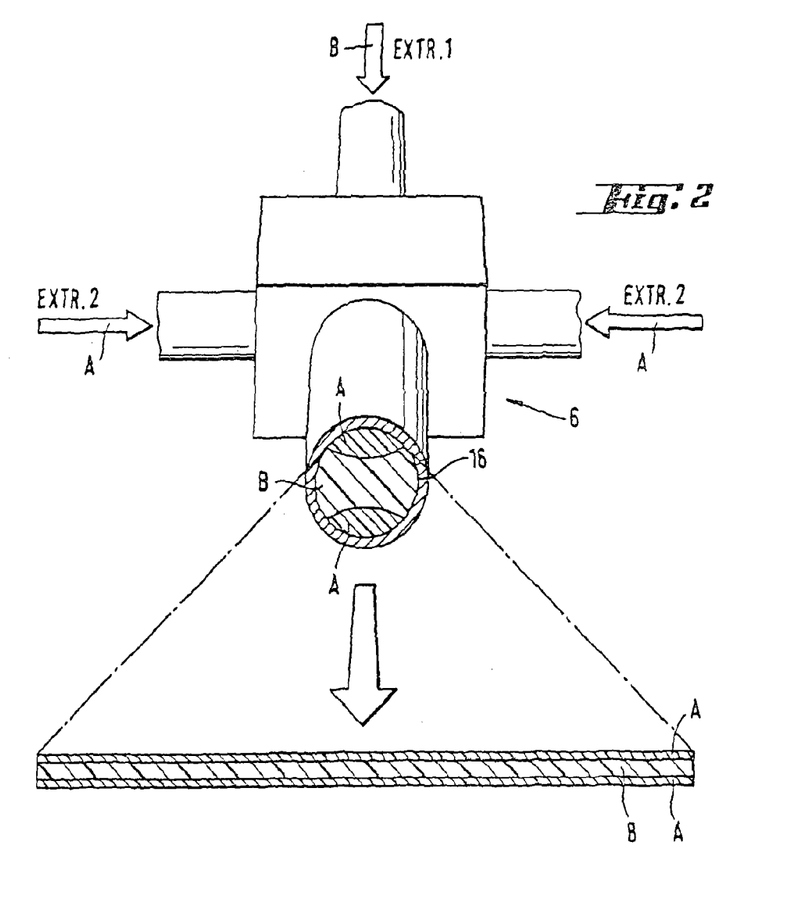
FIG. 2 depicts a coextrusion adapter 6 in an arrangement to provide a multilayer film comprising cover layers of A on both sides of a layer of B.

The prefilm obtained in this way is stretched lengthwise and transversely to the extrusion direction, causing the molecule chains to be oriented biaxially. This biaxial orientation is carried out consecutively, and stretching preferably performed lengthwise first (in the direction of the machine) and then transversely (perpendicularly to the direction of the machine). In the lengthwise direction, the material is preferably stretched by a factor of 4:1 to 9:1, particularly 5:1 to 8.5:1, and transversely preferably by a factor of 6:1 to 11:1. Lengthwise stretching will ideally be carried out with the aid of two rollers running at different speeds in keeping with the intended stretching ratio, and transverse stretching with the aid of a corresponding clip frame. The clips clasp the border area of the film so that essentially only the mixture of polymer B and material that has been recycled once from polymer A is stretched into a thin film (14) and the borders (12) of polymer A remain unstretched and thick. This is shown diagrammatically in FIG. 1.

The temperatures at which lengthwise and transverse stretching are carried out may vary within a wide range and are determined by the respective composition of the layers and the desired properties of the film. In general, lengthwise stretching is carried out at 80 to 160° C., preferably 100 to 160° C., and transverse stretching at 120 to 170° C., preferably 130 to 160° C.

After biaxial stretching, the film is immediately thermofixed (annealed), wherein the film is maintained at a temperature of 100 to 160° C., preferably 110 to 130° C., for a period of 0.1 to 10 seconds.

As indicated previously, after biaxial stretching one or both surfaces of the film is/are subjected to one of the known corona, flame or plasma treatment processes. The treatment intensities are within the normal parameters, which are 35 to 50 mN/m, preferably 36 to 45 mN/m.

For the alternative corona treatment, the film is drawn between two electrodes that serve as guide elements, wherein the voltage between the electrodes, usually AC voltage is so high (about 10,000 V and 10,000 Hz), that corona discharges can take place. The corona discharge causes the air above the film surface to ionise and react with the molecules in the film surface, so that polar pockets are created in the essentially apolar polymer matrix.

After the optional surface treatment or thermofixing, the film is trimmed with standard cutting devices, and the film itself is rolled up on a known winding device. In general, the width of the two borders to be trimmed is up to 300 mm, preferably 100 to 200 mm, and consists of at least 90% by weight, preferably 95-100% by weight, and especially 99-100% by weight of propylene polymer A. When the edge strip is separated, the width of the trimmed border should advantageously be chosen such that as far as possible all of the material separated as edge strip consists in a proportion of almost 100% by weight, that is to say solely of virgin polymer A. The advantage of the method according to the invention also consists in that it is not necessary to cut away the edge strip so deeply that the film contains no edge strip polymer A at all, since polymer A is now of sufficiently high film quality and does not form any areas of lower quality. In contrast, in the method according to EP 0 740 993 it is imperative to trim the edge strip away at such a point that ensures all content of polymer A is removed and the film contains no polymer A whatsoever. This then results in edge strip trimming that consists of a mixture of polymer A and small quantities of polymer B. At all events, the method according to EP 0 740 993 requires trimming a relatively wide edge strip, whereas in the method according to the present invention the width of the edge strip to be trimmed may be kept narrow. Of course this applies particularly if identical raw materials are used as both polymer A and B, as is the case in a preferred embodiment.

In standard production methods, the film border has a thickness of up to 200 μm, generally from 20 to 100 μm, preferably 20 to 50 μm. Depending on the circumstances, border thicknesses greater or less than this may also be suitable.

According to the invention, the cut (trimmed) border areas are chopped, granulated if necessary, mixed with polymer B so that it may be reused in the film as recycled material. The method according to the invention ensures that propylene polymer A in the finished film has undergone the extrusion process not more than three times, preferably only twice, first as edge strip material and then as an admixture to the actual raw material for the film. A third extrusion step may be added if the cut edge strip material is regranulated before mixing with polymer B. Since the edge strip of the film is continuously run using exclusively virgin polymer in the manufacturing process, it is not possible to produce any material that has passed through an extrusion process multiple times, that is to say more than two or three times. Surprisingly, neither the electrical nor any other properties of the film are affected negatively by the fraction of polymer that has been recycled once.

The film that is manufactured according this inventive method lends is therefore ideally suitable for use as a dielectric in capacitors. If necessary, the film may be metallised beforehand using methods known from the related art. It has been found that the fractions of recycled materials impair the performance characteristics of the capacitors only to a very limited degree, if at all. It is thus possible to achieve significant cost advantages without loss of quality.

The following measuring methods were used to characterize the raw materials and films:

Melt Flow Index:
The melt flow index was measured under a load of 21.6 N and at 230° C. in accordance with the specifications of DIN 53 735.

Melting Point:
DSC measurement, maximum on the melting curve, heating rate 20° C./min.

E Modulus
The E modulus will be determined at least 10 days after production in accordance with EN ISO 521-1 on a specimen having a size of 15*100 mm².

Shrinkage:
Longitudinal and transverse shrinkage values are relative to the linear dimension of the film expansion in each direction (lengthwise $L_0$ and transverse $Q_0$) before the shrinking process. The lengthwise direction is the direction of the machine, and the transverse direction is correspondingly defined as the direction perpendicular to the direction of the machine. The specimen of 10*10 cm² will be shrunk in a convection oven at the respective temperature (from 100 to 140° C.) for a period of 15 min. The remaining linear dimensions ($L_1$ and $Q_1$) of the specimen will be determined again for the lengthwise and transverse directions. The difference between the determined linear dimensions and the original dimensions $L_0$ and $Q_0$ is then expressed as shrinkage in a percentage of the original length times 100.

$$\text{Längsschrumpf } L_s[\%] = \frac{L_0 - L_1}{L_0} * 100[\%]$$

$$\text{Querschrumpf } Q_s[\%] = \frac{Q_0 - Q_1}{Q_0} * 100[\%]$$

This method for determining lengthwise and transverse shrinkage corresponds to DIN 40634.

Dielectric Loss Factor:
The dielectric loss factor (tan α) is calculated according to VDE 0303, Part 4. Both sides of the film specimens are coated with aluminium vapour in a vacuum coating plant before the measurement. The dimensions of the measurement area F (=coated area) vary according to the film thickness d:
for a film thickness d≤10 μm, an area of 1 cm²
for a film thickness d>10 μm, an area of 5 cm²
A double determination is carried out on each specimen to be tested, and the average is calculated therefrom. The specimens are placed in a drying cabinet. The lower electrode plate is made of brass. The upper electrode is cylindrical and is also made of brass. The test voltage is 1V. One measurement is taken at each of three frequencies, 0.1 KHz, 1 KHz and 10 KHz.

Residual Ash Content:
In order to measure the residual ash content, the fraction of non-combustible mineral filler substances is determined quantitatively. The residual ash content (annealing loss) is calculated from the original weight of the specimen and the ash content. The measurement result is indicated in ppm. A representative random sample of about 1 kg is remove from the material to be tested (granulate, regenerate, etc.). The material must be clean and completely dry; it may be necessary to pre-dry the specimen in a convection warming cupboard at about 80° C. Three empty porcelain crucibles are annealed in the crucible furnace for at least 1 h at a temperature of 650° C., and after cooling to room temperature in the desiccator are weighed with an accuracy of 0.1 mg. Annealing is repeated until a constant weight is achieved between two consecutive weighings. Then, 50 g (+/−0.1 g) material is weighed into each crucible, which are placed in the muffle kiln, which has been preheated to 650° C. The temperature in the kiln is now raised to 1,000° C. and kept constant at this temperature for at least 1 h. After the crucibles have been cooled in the desiccator, they are weighed again with an accuracy of 0.1 mg. The ash content is expressed with the measurement unit ppm (parts per million)=mg/m³. All three crucibles are evaluated according to the following formula, and the two with values closest to one another are combined to yield an average:

ppm=Final weight (g)/Initial weight (g)×1,000,000

Chlorine Content:

The chlorine content in polyolefins is measured quantitatively by X-ray Fluorescence Spectroscopy (XFS) in accordance with DIN 51 001, Part 1. A tablet of made from compacted granulate/powder, and this is measured against a calibration curve using XFS. The calibration curve was compiled on the basis of 10 calibration specimens in which the chlorine content was determined in an unrelated method (wet process).

Determination of Molecular Weight:

In order to determine the average molecular weight Mw, three detector gel permeation chromatography is used. The substance is dissolved in an eluent such as THF and injected onto a separation column. The separation column is 90 cm long and filled with a porous carrier material with a pore size of 5 μm. Detection is carried out using UV absorption spectroscopy at various wavelengths, also on the basis of the refractive index and light scattering capability of the fractions. Calibration is performed via a standard composition having known molecular weight. Molecular weights are able to be assigned by comparing the UV absorption of the standard substance with the absorption of the specimen (DIN 55 672 Part 1).

The invention will now be explained in greater detail with reference to exemplary embodiments:

Example 1

A transparent film having thickness of 6 μm and an untrimmed width of 4940 mm was produced by extrusion and subsequent progressive orientation in the longitudinal and transverse directions. The film thus produced consisted of a single layer. At the start of production, the adjacent molten masses "Trimming strip-Film-Trimming strip" were drawn out of the same raw material. For common extrusion and arrangement of the separate melt flows, the adapter equipment was used, and had been rotated through 90° with respect to the usual arrangement for multilayer coextrusion B-Original Polymer for Film:

~100% by weight highly isotactic polypropylene manufactured by Borealis (brand name HB 300 BF) with a melting point of 165° C. and a melt flow index of 3.5 g/10 min at 230° C. and 2.16 N, having a residual ash content of about 20 ppm and a chlorine content of <1 ppm 0.45% by weight Irganox 1010 phenolic stabiliser 0.0075% by weight Ca stearate as neutralising agent A-Trim Strip Polymer:

~100% by weight highly isotactic polypropylene manufactured by Borealis (brand name HB 300 BF) with a melting point of 165° C. and a melt flow index of 3.5 g/10 min at 230° C. and 2.16 N, having a residual ash content of about 20 ppm and a chlorine content of <1 ppm 0.45% by weight Irganox 1010 phenolic stabiliser 0.0075% by weight Ca stearate as neutralising agent After startup, a 10 cm wide trimming strip was separated on both sides in the outfeed area and before the film was wound up, which strip was then reduced in a chopper. This chopped film material was then transported via conveyor means to the extruder together with raw film material B, with which it was mixed and melted together with the original raw material. The border area was still running continuously with virgin original raw material.

The production conditions in the various process steps were:

| Extrusion: | Temperatures | 250° C. |
|---|---|---|
| | Temperature of drawing roller: | 97° C. |
| Lengthwise stretching: | Lengthwise stretching temperature | 150° C. |
| | Lengthwise stretching ratio: | 5.5 |
| Transverse stretching: | Temperature: | 160° C. |
| | Transverse stretching ratio: | 9.5 |
| Annealing: | Temperature: | 140° C. |
| | Convergence: | 15% |

The transverse stretching ratio is an actual value. This actual value is calculated from the final film width less twice the trim strip width, divided by the width of the longitudinally stretched film, which is also reduced by twice the trim strip width.

In this way, a film was produced that contained approximately 22% by weight of raw material that had been recycled once Examples 2a to 2c Compared with example 1, the chopped film material was treated by one-time melting and cooling to produce a regranulate in a separate processing step. This regranulate was then processed together with film raw material B in similar manner. In this way, more films were produced containing 5%, 10%, 30% raw material that had been recycled once.

Comparison Example 1

Compared with example 1, the border area was not run with a separate molten mass flow, the film and border area were drawn from one extruder. As was described in example 1, the border area was trimmed, chopped, and reused in the production of the film. In this way, a film was produced containing approximately 22% of raw material that had been recycled multiple times.

Comparison Example 2

Compared with example 1, the border area was not run with a separate molten mass flow, the film and border area were drawn from one extruder. The border area was trimmed and disposed of as waste, that is to say the film was produced using only original raw material and contained no recycled raw material regardless of the number of times it had been recycled.

Example 3

A film was produced as described in example 1. Unlike example 1, a three-layer film was co-extruded having a cover layer on both surfaces of the base layer. The base layer corresponded to the film of example 1. Both additional cover layers were constructed from 100% by weight propylene polymer B as described in example 1. The thickness of the base layer was about 5 μm. The thickness of each cover layer was about. 0.5 μm, so that the total thickness of the film as in example 1 was 6 μm. The rest of the composition and the process conditions were unchanged from example 1. In this way, a three-layer film was produced containing approximately 26% by weight of polymer that had been recycled once in the base layer (corresponding to 22% by weight relative to the film as a whole).

Example 4

A film was produced as described in example 2b. Unlike example 2b, a three-layer film was co-extruded comprising a cover layer on both surfaces of the base layer. The base layer corresponded to the film of example 2b. Both additional cover layers were constructed from 100% by weight propylene polymer B as described in example 2b. The thickness of the base layer was about 5 µm. The thickness of each cover layer was about. 0.5 µm, so that the total thickness of the film as in example 2b was 6 µm. The rest of the composition and the process conditions were unchanged from example 2b. In this way, a three-layer film was produced containing approximately 12% by weight of polymer that had been recycled once in the base layer (corresponding to 10% by weight relative to the film as a whole).

| Example | Breakdown voltage AC/DC [KV/mm] | E modulus MD/TD [N/mm2] | Shrinkage MD/TD [%] | Flaws as number per sq. m. at 300 V |
|---------|---------|---------|---------|---------|
| 1 | 419/813 | 2820/4700 | 3.0/0.60 | 0 |
| 2a | 410/795 | 2825/4710 | 3.0/0.62 | 0 |
| 2b | 425/780 | 2798/4680 | 3.2/0.65 | 0 |
| 2c | 428/755 | 2752/4580 | 3.2/0.65 | 1 |
| VB1 | 380/650 | 2500/4300 | 3.4/0.66 | 5 |
| VB2 | 420/815 | 2910/4850 | 3.1/0.62 | 0 |
| 3 | 420/813 | 2870/4750 | 3.0/0.60 | 0 |
| 4 | 418/805 | 2875/4720 | 3.2/0.60 | 0 |

The invention claimed is:

1. A process for the production of a biaxially oriented polypropylene film wherein the film comprises at least one layer, which comprises heating and melting propylene polymer B in a first extruder and shaping and extruding the molten mass of the propylene polymer B through a flat sheet die and taking off the melt exiting the flat sheet die on one or more rolls and solidifing to give a precursor and streching the precursor in the longitudinal and transverse direction, wherein
   A. a propylene polymer A without a fraction of recycled material is heated and melted in a second extruder, and
   B. the molten mass of the propylene polymer A is fed to two sides of the propylene polymer molten mass B in such a way that all of the molten masses are extruded together and simultaneously through the flat sheet die, and the propylene polymer A without a fraction of recycled material forms border regions of the film during the production process, and
   C. two border regions comprising the propylene polymer A are cut off after longitudinal and transverse stretching of the film, and
   D. this film cut off from the two border regions is melted and mixed together with the polypropylene polymer B and extruded to form the precursor film in the first extruder, wherein the process comprises no material that has passed through the process more than once.

2. The process as recited in claim 1, wherein the propylene polymer B and the propylene polymer A are the same polymer.

3. The process as recited in claim 1, wherein the propylene polymer A is extruded a first time as an edge strip and a second time together with the polymer B as the film.

4. The process as recited in claim 1, wherein the propylene polymer A is melted, extruded and cooled during regranulation of an edge strip material.

5. The process as recited in claim 1, wherein the proportion of recycled polymer A in the mixture of polymer B and recycled polymer A is 0.5 to 40% by weight.

6. The process as recited in claim 1, wherein a stabilizer or neutralizing agent or both a stabilzer and a neutralizing agent are added to the propylene polymer B and the propylene polymer A.

7. The process as recited in claim 1, wherein the residual ash content of the propylene polymer A is <70 ppm and the chlorine content is <50 ppm.

8. The process as recited in claim 1, wherein the propylene polymer A is a mixture of various propylene polymers with no recycled material content.

9. The process as recited in claim 1, wherein the propylene polymer B is a mixture of various propylene polymers.

10. The process as recited in claim 1, wherein the propylene polymers A and B are different polymers and the melting points of the propylene polymers A and B differ from one another by not more than 15° C.

11. The process as recited in claim 1, wherein the polypropylene film comprises a further layer.

12. The process as recited in claim 1, wherein the film includes multiple layers and the layer containing propylene polymers A and B forms a base layer of the multilayer film.

13. The process as recited in claim 1, wherein the film, has one or more cover layer(s) on one or both sides, which contain 98-100% by weight propylene polymer B.

14. The process as recited in claim 1, wherein the film has a separated border area which consists of 99-100% by weight propylene polymer A.

* * * * *